Aug. 14, 1956     L. SILVERMAN ET AL     2,758,671
HIGH TEMPERATURE FILTERING MEDIUM

Filed June 22, 1953     3 Sheets-Sheet 1

INVENTORS.
Leslie Silverman
Robert A. Davidson
BY Webb, Mackey + Burden
THEIR ATTORNEYS INVENTORS.
Leslie Silverman
Robert A. Davidson
BY Webb, Mackey & Burden
THEIR ATTORNEYS Aug. 14, 1956  L. SILVERMAN ET AL  2,758,671
HIGH TEMPERATURE FILTERING MEDIUM
Filed June 22, 1953  3 Sheets-Sheet 3

INVENTORS.
Leslie Silverman
Robert A. Davidson
BY
Webb, Mackey & Burden
THEIR ATTORNEYS

United States Patent Office 2,758,671
Patented Aug. 14, 1956

2,758,671

HIGH TEMPERATURE FILTERING MEDIUM

Leslie Silverman, Dover, Mass., and Robert A. Davidson, Ransomville, N. Y.

Application June 22, 1953, Serial No. 363,367

12 Claims. (Cl. 183—49)

Our invention relates to a high temperature filtering medium. It is particularly directed to a filtering medium for use in reverse jet filtering units but it is possible to use it in other types of air filtering applications where reverse air flow is available for cleaning purposes.

Efficient and economic filtration of industrial gases and dust laden air confronts many manufacturers. Industrial plants face a problem of disposal of unfiltered dust carrying air and gases which must be allowed to escape into the surrounding atmosphere. Where release of unfiltered gases is uncontrolled, the surrounding community receives an excessive deposit of dirt and foreign matter on its streets, buildings, parks, etc. The health of some citizens in such communities has suffered and at few have died. In farming areas, damage and destruction of crops and fruit trees has resulted. Consequently, law making bodies have enacted legislation which requires certain industrial plants to filter or treat fume laden air before releasing it.

Filtration of air-born particles from air and gases requires that the finest particles collect on the filtering medium and that the flow of air or gas into the atmosphere continues at a uniform and undiminished rate. In other words, the filter must catch the particles regardless of their size and simultaneously permit passage of the filtered air is undiminished volume. Since some particle sizes are in the sub-micron range, an efficient filter must stop the passage of such particles while permitting the flow of air. Where the particles are larger, a relatively less efficient filter is satisfactory.

Another consideration in filtration of dust from air and gases is the temperature of the unfiltered air or gas. It is known that the use of wool felt as a filtering medium is limited to temperatures of about 185° F. Where the temperature of the unfiltered air or gas is substantially higher, auxiliary equipment for lowering the temperature of this air or gas before filtration is necessary. Some of the elements of this auxiliary equipment includes such devices as motor controlled by-pass dampers, temperature limit switches, thermal fuses and water interlocked switches. This auxiliary cooling equipment increases the cost of a filter installation.

Our invention provides a filtering medium which has a long service life and which efficiently removes particles as fine as 0.3 micron and lower at elevated temperatures. Furthermore, our invention enables manufacturers to substantially eliminate the use of auxiliary devices for lowering the temperature of unfiltered gases. To accomplish this we employ a filtering medium having a core layer of inorganic fibers resistant to high temperatures disposed between layers of fabric made from material resistant to high temperatures. All of these layers are fastened together by binding means which divides the medium into patches. The preferred manner of fastening the layers together is by quilting them to form patches but other means which fastens the layers together and forms patches may be employed. For instance, we may use staples or clips or wire of suitable metal such as stainless steel for this purpose.

By inorganic fibers, the core material, as used in this specification and claims, we mean fine fibers which give sustained performance in filtering extremely fine fume at high temperatures. We have found fibers made from certain ceramics, minerals, slags and metals satisfactory. Some examples are fibers made from sodium calcium silicates, from calcium aluminates, from aluminum silicates, from calcium silicates and from sodium silicates.

The following is a table of some glass compositions which are suitable for core fibers:

|  | 1 | 2 | 3 | 4 | 5 |
|---|---|---|---|---|---|
| $SiO_2$ | 72 | 70 | 75 | 54 | 6 |
| $Al_2O_3$ | 1 | 3 | 5 | 22 | 40 |
| CaO | 9 | 7 |  | 14 | 49 |
| MgO | 3 |  |  |  | 5 |
| $Na_2O$ | 15 | 14 | 6 |  |  |
| $B_2O_3$ |  |  | 9 |  |  |
| $K_2O$ |  | 6 | 1 |  |  |
| BaO |  |  | 4 | 5 |  |
| $P_2O_5$ |  |  |  | 5 |  |

Asbestos is one mineral fiber we have found satisfactory.

Fibers made from blast furnace slag are also suitable.

In the metallic class we include steel wool, nickel-copper wool, and fibers made from copper, iron, stainless steel and other metal wools of fine fiber size.

By fabrics made from material resistant to high temperatures as used in this specification and claims, we mean fabrics which withstand elevated temperatures and which are relatively unaffected by composition of gases and compositions of fume and dust carried by the unfiltered air and gases. With a temperature range up to 270° F. we use fabrics made from acrylic fibers such as "Orlon" and "heat treated orlon." "Orlon" and heat treated "Orlon" have the desirable property of abrasion resistance. "Orlon" converted to the "black" form gives satisfactory performance in temperatures up to 400° F. For temperatures above 400° F. we use glass cloth and other fabrics made from ceramic fibers including the same ceramic fibers which we use for the core material. We also include fabrics made from metals such as steel, nickel-copper alloys, copper and iron. In temperature ranges up to 2000° F. and higher we use fabrics made from aluminum silicate fibers and other ceramic fibers capable of withstanding temperatures in this range.

In one preferred embodiment of our invention we employ a core or layer or fine glass fibers placed between two layers of fabric made from acrylic fibers such as "Orlon." We quilt this core and the two layers of "Orlon" fabric together with "Orlon" thread. This quilted medium has a 2″ quilt pattern and a diagonal weave. One of the "Orlon" fabric layers has a napped surface on its inner side in contract with the glass fibers. This napped surface holds the fine glass fibers in place, thereby, insuring maintenance of their uniform distribution throughout each quilt patch. This uniform fiber distribution results in efficient and uniform filtering throughout the entire area of the filter.

The quilted or equivalent patch structure of our filtering medium lends strength to the bag and holds the core fibers in place. As pointed out above, maintaining these fine fibers in position is essential for efficient and uniform filtering. Where the fibers are long and rough, large and wide quilt patches suffice since these fibers tend to cling to the bag material and to each other. Hence, when they are initially uniformly distributed throughout each quilt patch they tend to maintain this distribution. Where, however, the core fibers are short and smooth, small patches are essential to insure efficient and uniform filtering because such fibers do not cling to the bag material or to each other, nor do they maintain a relatively uniform distribution within a patch. A napped inner surface on one or both layers of the bag material is helpful in maintaining a proper fiber distribution throughout a single patch. The quilted structure of our bag serves a further purpose, namely, it lends wear resistance to the medium, thus prolonging its useful life.

We have found that the efficiency of our invention is dependent upon a number of factors. The maximum efficiency results from a medium which has a minimum of quilting for a particular core material where the core fibers maintain a uniform distribution throughout the entire area of each quilt patch. The number of quilt stitches affects efficiency of our medium because there may be an escape of fine fume through or adjacent these stitches. The nature of the core material affects efficiency since long, rough fibers with wider spacing therebetween do not collect as much fine dust as short smooth fibers wih relatively close spacing between each fiber. Likewise, the nature of the bag fabric affects efficiency.

A layer of felted fibers, a matte of fibers, a mass of fibers and a mass of fibers held together by bonding agents are some of the types of core media which we utilize.

In the accompanying drawings which illustrate a preferred embodiment of our invention:

Figure 2:
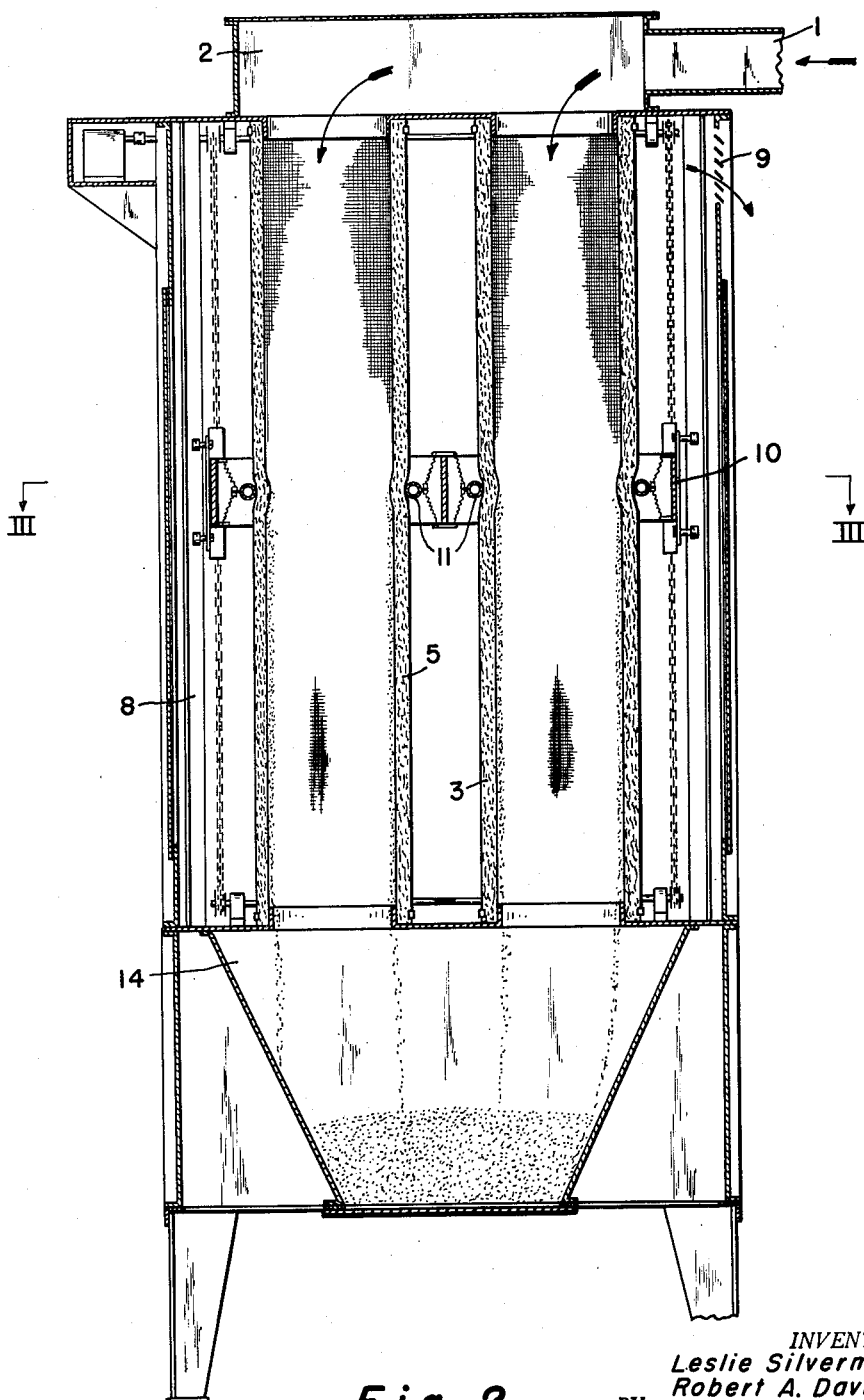
Figure 2 is a longitudinal section of the reverse jet filter unit shown in Figure 1.
Figure 3:
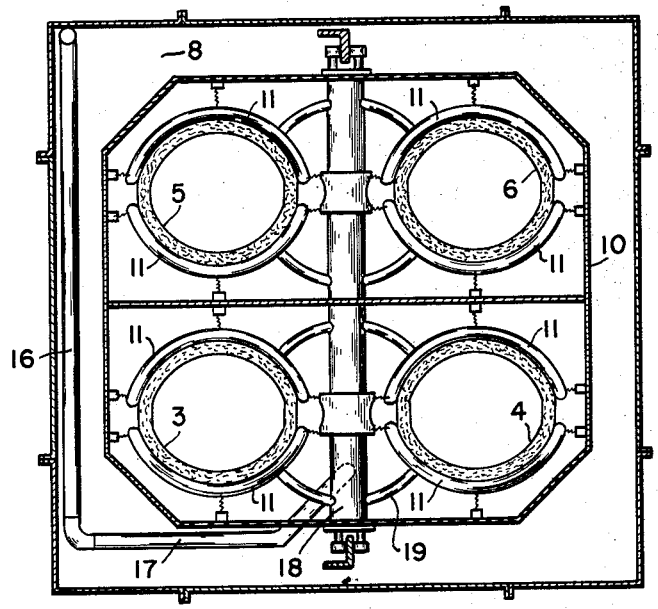
Figure 3 is a transverse section taken along the line III—III of Figure 2.

The reverse jet filter unit shown is a four-bag machine. Referring to Figure 2, dust laden air passes through conduit 1 into receiving chamber 2 where the air flows downwardly into four filter bags 3, 4, 5 and 6. The dust laden air next passes laterally from the interior of the bags as shown by the arrow 7, Figure 5, into chamber 8 and thence to louvers 9 where it escapes into the atmosphere. The bags 3, 4, 5 and 6 filter the air as it passes therethrough.

Figure 1:
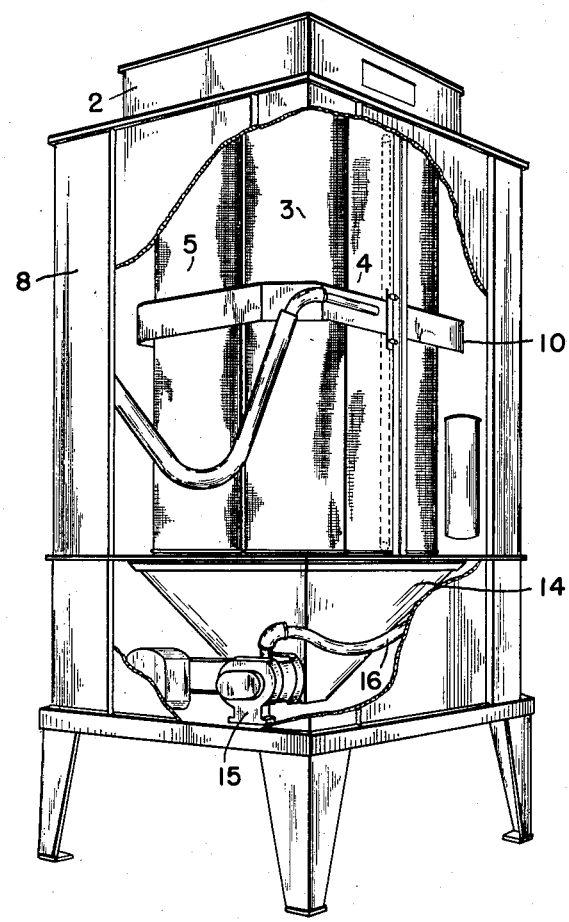
Figure 1 is a perspective view of a reverse jet filter unit, parts being broken away.

As the fume laden gas or air passes through the filter bags, dust or fume collects on the interior side of each bag. The reverse jet filter unit has a blow ring structure 10 which travels vertically up and down the exterior of the bags intermittently during a filter period. This structure 10 has a pair of semi-circular blow rings 11 for each bag. Each pair of blow rings substantially circles its bag and flexes it slightly as it travels up and down (see Fig. 5). A horizontal slot 12 extending throughout the inner periphery of each ring permits a jet of air to flow from the ring through the bag as shown by arrow 13 in Figure 5. This flow of air from the blow ring and the flexing of the bags clears or frees accumulated dust or fume from each bag. The freed dust then falls into a collecting hopper 14 at the bottom of the unit. The downward flow of air within each filter bag supplements gravity in conveying the dust to the hopper. A blower 15 (Fig. 1) delivers air under pressure through conduits 16, 17, 18 and 19 to the blow rings.

Figures 4, 5:
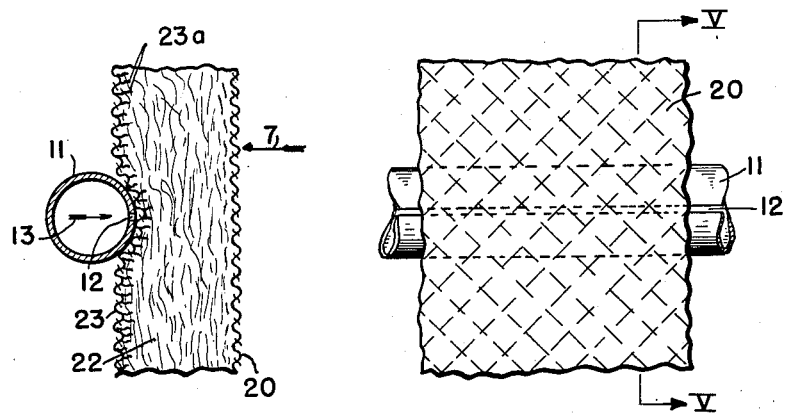
Figure 4 is a side elevation of a portion of our filter medium and an adjacent blow ring.
Figure 5 is a section taken along the line V—V in Figure 4.

Figures 4 and 5 show our bag construction. It comprises an inner layer 20 of "Orlon" fabric. Next to the inner layer of "Orlon" fabric is a core 22 of fine glass fibers. On the outside of this core of glass fibers is an outer layer 23 of "Orlon" fabric having a napped surface 23a on its inner side. Although a napped surface can be used on the inside of either or both of the layers 20 and 23 for holding the fibers 22 in place, it is particularly advantageous to have the napped surface on the inside of the outer layer 23. With such an arrangement, the action of the reverse jet air flow 13 is to clean out the nap should any material lodge there. All the layers are quilted together with "Orlon" thread in a diagonal weave.

We select the bag material in accordance with the temperature range at which the unfiiltered gas or air is delivered to the filtering unit. The composition of the gases and fume also affect the bag material selection. The selection of the core material is dependent upon the composition of the air and fume and upon the fineness of the fume or dust. For example, for filtering fine silicate fume in the 0.3 micron range or under, from a ferrosilicon producing furnace, we employ the "Orlon" fiber fabric, glass fiber core filtering medium described above Other examples of filter bag constructions which we use are a core of fiber glass sandwiched between layers of glass cloth, a core of ceramic fibers disposed between layers of fabric made from threads of the core fibers, a core of ceramic fibers between layers of fabric made from threads of ceramic fibers other than the core fibers, and a core of fine ceramic fibers between layers of metallic fabrics such as steel, nickel-copper alloys, copper and iron. All of our bags employ the quilted or equivalent patch structure. The quilt patches vary in size depending upon the nature of the core fibers and the bag fabrics.

In sustained operation in filtration of silica fume from a ferro-silicon making furnace, we have found that our "Orlon" fiber, glass core medium is 89 to 99 percent efficient and between 95 and 99 percent efficient after the bag has been in use for a while. This operation has demonstrated that the capacity of our filtering medium is three to four times higher than that of any other commercial cloth filter. In this operation we have filtered silica fume as fine as 0.3 micron and under at weight efficiencies of 95 to 99 percent.

By using inorganic fibers for the core material, by using fabrics made from materials resistant to high temperatures for enclosing the core and by quilting the fabrics and core together we can filter dust laden air or gases which carry fume in the sub-micron range at efficiencies ranging from 89 to 99 percent at temperatures ranging from 200° F. to 2000° F. and higher.

This means that our filtering medium substantially eliminates precooling of dust laden gases or air. Hence a manufacturer can save up to 10 percent in the cost of filtering units because complicated precooling equipment such as motor-controlled by-pass dampers, temperature limit switches, thermal fuses and water interlocked switches which operate to shut down a unit or shut down by-pass filters upon failure of the water supply are not necessary.

With our filtering medium, industrialists can safely filter high temperature dust laden stack gases and release the filtered gas into the atmosphere without endangering the lives of local inhabitants and without damaging surrounding lands and buildings.

While a certain embodiment of the invention has been shown and described it will be understood that it may be otherwise embodied within the scope of the appended claims.

We claim:

1. In reverse jet cleaning devices, a filtering medium comprising a layer of inorganic fibers resistant to high temperatures disposed between layers of fabric made from material resistant to high temperatures, binding means dividing the medium into a plurality of patches, all of said layers being stitched together by said binding means around the periphery of each patch whereby the fibers of said layer of inorganic fibers in one patch are prevented from migrating to an adjacent patch, said binding means forming a common boundary between adjacent patches, whereby a quilt with a plurality of patches is formed from all of said layers and said binding means.

2. A filtering medium according to claim 1 wherein said binding means is made of the same material as said fabric.

3. A filtering medium according to claim 1 wherein the layer of inorganic fibers is a matte.

4. A filtering medium according to claim 1 wherein the layer of inorganic fibers is composed of felted fibers.

5. A filtering medium according to claim 1 wherein one of said layers of fabric has a napped surface on its inner side which contacts the layer of inorganic fibers.

6. A filtering medium according to claim 1 wherein the outer layers of said layers of fabric has a napped surface on its inner side which contacts the layers of inorganic fibers.

7. A filtering medium according to claim 1 wherein the layers of fabric are made of the same inorganic fibers as those which comprise said layer of inorganic fibers.

8. A filtering medium according to claim 1 wherein the layer of inorganic fibers is composed of glass fibers.

9. A filtering medium according to claim 1 wherein the layer of inorganic fibers is composed of felted fibers and wherein one of said layers of fabric has a napped surface on its inner side which contacts the layer of felted fibers.

10. A filtering medium according to claim 1 wherein the layer of inorganic fibers is a matte and wherein one of said layers of fabric has a napped surface on its inner side which contacts the matte.

11. A filtering medium according to claim 1 wherein the layer of inorganic fibers is composed of glass fibers and wherein one of said layers of fabric has a napped surface on its inner side which contacts the layer of glass fibers.

12. A filtering medium according to claim 1 wherein the layer of inorganic fibers is composed of glass fibers and wherein the layers of fabric are made of glass fibers.

References Cited in the file of this patent

UNITED STATES PATENTS

| | | |
|---|---|---|
| 582,518 | Birch | May 11, 1897 |
| 1,321,490 | Sweetland | Nov. 11, 1919 |
| 1,530,674 | Jackson | May 24, 1925 |
| 1,995,648 | Rathbun | Mar. 26, 1935 |
| 2,057,446 | Rathbun | Oct. 13, 1936 |
| 2,137,246 | Myers | Nov. 22, 1938 |
| 2,206,220 | Burk | July 2, 1940 |
| 2,573,844 | Hersey | Nov. 6, 1951 |